United States Patent [19]

Seibert et al.

[11] Patent Number: 5,351,260
[45] Date of Patent: Sep. 27, 1994

[54] THORIATED-TUNGSTEN, SPLIT-RING, HOLLOW-CATHODE ELECTRODE FOR DISCHARGE DEVICES

[75] Inventors: Edward J. Seibert, Chalfont; Gerald D. Ferguson, Yardley; Marie E. Taylor, Chalfont, all of Pa.

[73] Assignee: The United States of America as represented by the Secretary of the Navy, Washington, D.C.

[21] Appl. No.: 209,345

[22] Filed: Mar. 14, 1994

[51] Int. Cl.$^5$ ............................................. H01S 3/097
[52] U.S. Cl. ...................................... 372/84; 372/61; 372/88
[58] Field of Search .................... 372/87, 92, 61, 88

[56] References Cited

U.S. PATENT DOCUMENTS

| | | | |
|---|---|---|---|
| 3,946,332 | 3/1976 | Samis | 372/87 |
| 4,088,966 | 5/1978 | Samis | 372/85 |
| 4,696,011 | 9/1987 | Kearsley | 372/61 |
| 4,794,614 | 12/1988 | Maitland et al. | 372/61 |
| 4,955,033 | 9/1990 | Maitland et al. | 372/56 |
| 4,956,845 | 9/1990 | Otto et al. | 372/56 |

OTHER PUBLICATIONS

A Request for Quotation No. N62269-88-Q-3120 to build a prototype of the invention for experimentation was issued Feb. 24, 1988 and sent to 6 potential bidders and culminated in a Purchase Order No. N62269-8-9-M-3124 issued May 23, 1989.

Primary Examiner—Léon Scott, Jr.
Attorney, Agent, or Firm—James V. Tura; James B. Bechtel; Susan E. Verona

[57] ABSTRACT

An electrode assembly for a gas or metal vapor discharge device is disclosed. A pair of electrode assemblies each comprising thoriated tungsten with an alloy composition of tungsten (W) and from about 2% to about 3% of thorium dioxide ThO2 are located at opposite ends of the discharge chamber of the discharge device. The tip of the electrode preferably has four slots equally spaced around its circumference and a groove at its outermost edge. The tip of the electrode provides mechanical flexibility that inhibits the cracking of the thoriated tungsten electrode when it is mounted in the discharge device. Each electrode assembly further comprises a copper spacer, preferably I-shaped in cross-section, brazed against the base of the electrode and against a vacuum flange. The pair of electrode assemblies confines the discharge of the discharge device between the tips of the electrodes and inhibits the arc condition from finding its way to delicate vacuum seals. The electrode assembly provides a clear optical aperture to allow light or laser radiation to exit the discharge cell.

10 Claims, 2 Drawing Sheets

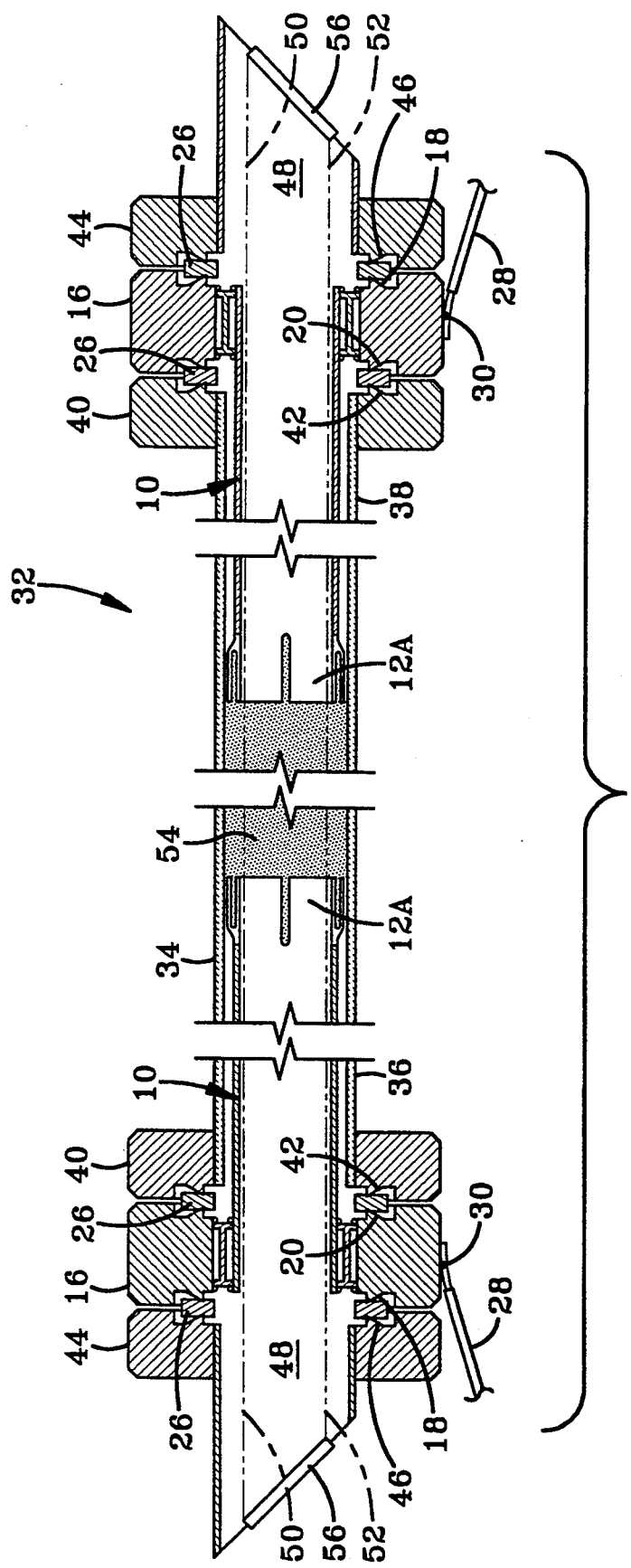

THORIATED-TUNGSTEN, SPLIT-RING, HOLLOW-CATHODE ELECTRODE FOR DISCHARGE DEVICES

The invention described herein may be manufactured and used by and for the Government of United States of America for governmental purposes without the payment of any royalties thereon or therefor.

BACKGROUND OF THE INVENTION

The present invention relates to metal vapor and gas discharge devices, and more particularly, to an electrode and its mounting arrangement for use in discharge devices.

Gas and metal vapor discharge devices are well known and each comprises oppositely positioned electrodes that cause the metal vapor or gas, confined within a near vacuum, to be electrically excited to create optical emissions, such as light or lasing. The selected metal, liquid, solid or gas, serves as the source for generating electromagnetic radiation, coherent in the case of lasing, in the ultraviolet, visible, or infrared regions of the spectrum. The metal, liquid or gas is sometimes referred to herein as being the light source. Similarly, the discharge device housing the electrodes and containing the light source is sometimes referred to herein as being a containment cell. Furthermore, the oppositely positioned electrodes are sometimes referred to as being cathode and anode electrodes, but are also referred to herein as simply being cathode electrodes because of the pulsed operation of the discharge device.

The excitation of the metal vapor or gas contained in a near vacuum is commonly created by applying an electrical pulse of several kilovolts at several hundred amperes current between the electrodes. For such an application, it is desired that the arc condition created by the pulsed excitation be confined between the tips of the electrodes and that each of the electrodes be nonsputtering. However, these conditions are not always attainable, as we realized in our initial attempts to provide an electrode for a discharge device.

In our first attempt, the electrodes were made of titanium in a simple cylindrical geometry, attached to an Oxygen-Free Conductivity ($\geq 99.9\%$) (OHFC) copper gasket to form a vacuum tight seal between two end flanges of a partially evacuated, electrically insulated containment cylinder or cell which confined the light source. These electrodes were subjected to operating temperatures in excess of 1000° C. causing thermal expansion thereof so that the electrodes swelled, which in turn caused cracking of the electrically insulating (ceramic) containment cell. In addition, the titanium was found to undesirably sputter. Furthermore, scorch marks occurred along the length of the electrodes, which indicated that the arc or discharge condition was being initiated over the full length of the electrode, rather than being confined between the tips of the electrodes.

Our next electrode design consisted of two concentric, hollow cylinders, brazed together at one end to form a narrow, elongated cup, and attached to an OHFC copper gasket to form a vacuum tight seal between two flanges of the cell. The inner cylinder was composed of thoriated tungsten and the outer cylinder was composed of titanium. The containment cell experienced a crack during high-temperature operation and the electrodes were inspected. Such inspection revealed that scorching occurred along the length of the cylinders, again indicating that the discharge condition was initiated over the full length of the electrode. Further, the outer titanium cylinder was found to sputter at operating temperatures, and the electrode swelled, causing stress fractures in the containment cell.

A further electrode design consisted of a hollow-cathode, thoriated-tungsten electrode brazed to an OHFC copper gasket so as to form a vacuum-tight seal between two flanges of the containment cell. After initial testing at operating temperatures in excess of 1500° C., it was found that this electrode design successfully contained the discharge between the tips of the electrode, and that the thoriated tungsten material did not sputter. However, because of thermal expansion at full operating temperature, the outer edge of the electrode tip swelled against the ceramic containment cell, thereby cracking the cell and causing stress fractures in the outer edge of the electrode tips. Because of these stress fractures, eventually the outer edge of the electrode tips cracked off, and when enough of this edge fell off, the hollow cathode design was defeated. That is, the discharge condition was no longer confined to the tips of the electrodes, and the electrodes received scorch marks along their length.

All of our first three approaches had a common disadvantage in that the faces of the copper gaskets had to be filed smooth after each use so as to allow for the creation of a metal vacuum seal. After several filings, the copper gasket became so thin that it had to be replaced by brazing a new gasket onto the base of the electrode; this limited the usefulness of the electrode configuration.

In our next design effort, a split-ring, hollow-cathode, thoriated-tungsten electrode was brazed onto a copper spacer, which in turn was brazed directly onto a vacuum flange that mated to the containment cell. After a relatively extensive amount of testing, the electrodes were removed from the containment cell for inspection. The electrodes successfully confined the discharge condition to occur between the tips of the electrodes, and the material used for the electrodes did not sputter. The splits (or slots) in the ring of the electrode gave the electrode tip enough flexibility that the outer edge of the electrode tip did not crack even after thermal expansion caused the tip to be forced against the containment cell. In addition, these electrodes were made reusable by being brazed directly onto a stainless steel vacuum flange that mated directly to the containment cell. However, major stress fractures developed around the base of the electrode just above the copper spacer during the brazing process required to attach the electrode to both the copper spacer and the vacuum flange. After many uses at operating temperatures, these stress fractures grew worse until the upper section of the thoriated tungsten cracked off near its base. This cracking indicated that a new thermal stress from different thermal expansion coefficients of the copper spacer, the thoriated tungsten and a stainless steel vacuum flange was being manifested in the fabrication process.

It is desired that electrodes be provided that are capable of withstanding the application of pulsed discharge excitation of several kilovolts at several hundred amperes peak currents and confining the discharge condition of the device created by these high currents to occur between the tips of the electrodes.

SUMMARY OF THE INVENTION

The present invention is directed to an electro-optic discharge device having a clear optical aperture with electrodes capable of withstanding the application of pulsed electrical excitation of several kilovolts at several hundred amperes peak current so as to generate a longitudinal pulsed discharge between the tips of the electrodes located in a near vacuum of a containment cell without causing fractures in the containment cell of the discharge device.

The discharge device comprises a hollow, electrically-insulating, elongated element whose interior serves as a discharge chamber, a pair of hollow cylindrical electrodes, each located at an opposite end of the discharge chamber, a pair of metallic spacers each of which is I-shaped in cross-section, a pair of members each having means for enclosing a vacuum and each having a flange, and a pair of optical windows. The cylindrical electrodes comprise thoriated tungsten with an alloy composition of tungsten (W) and from about 2% to about 3% of thorium dioxide ThO2. Each of the electrodes has a base and a tip, which has at least one annular groove and at least one slot in its outer portion. Each metallic spacer has its inner two "1" edges attached to the exterior base of a cylindrical electrode. The outer two "1" edges of the metallic spacer are attached to the interior surface of a vacuum enclosing flange. The electrode tips are inserted into each end of the hollow electrically insulating elongated element so that the inner sealing surface of the electrode base flange attaches to the hollow elongated element end flanges. Each optical window is attached to the exterior of the electrode base flanges of a respective member for enclosing the vacuum.

Accordingly, it is an object of the present invention to sustain a longitudinal pulsed discharge of several kilovolts at several hundred amperes peak current between the electrode tips located in a near vacuum without causing stress fractures in the hollow electrically insulating elongated element which acts as the containment cell.

It is a further object of the present invention to provide electrodes that increase the expected operational lifetime of the gas discharge device by not reacting with chemically corrosive metal vapors, sputtering, or swelling in any manner that would otherwise crack the containment cell.

Other objects, advantages and novel features of the invention will be apparent from the following detailed description when considered in conjunction with the accompanying drawings.

BRIEF DESCRIPTION OF THE DRAWINGS

FIG. 3 illustrates a gas discharge device having a pair of split-ring, hollow-cathode electrodes of the present invention located at opposite ends of an electrically-insulating containment cell which, in turn, has optical windows at opposite ends thereof.

DETAILED DESCRIPTION OF THE PREFERRED EMBODIMENTS

Figure 1:
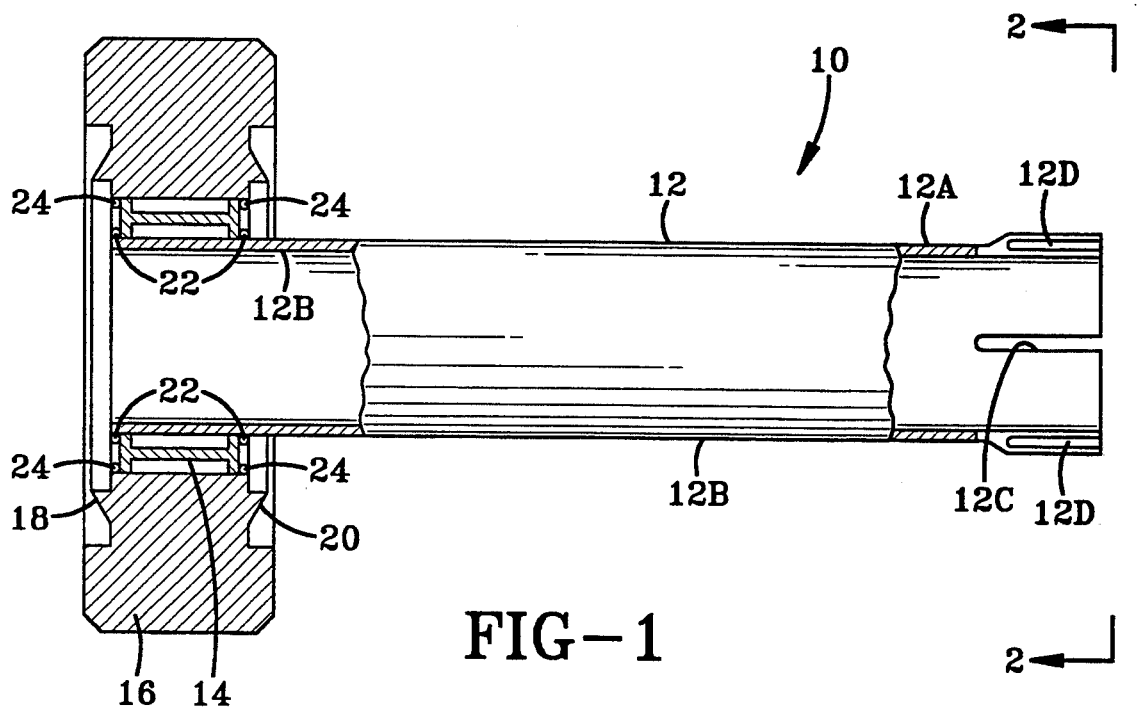
FIG. 1 is a side view, partially in section, illustrating the split-ring, hollow-cathode electrode of the present invention.

Referring to the drawings in detail, wherein like reference numbers indicate like elements, there is shown in FIG. 1 a side view, partially in section and partially cut away, of the split-ring, hollow-cathode electrode assembly 10 of the present invention. The electrode assembly 10 is particularly suited for and extends the operational lifetime of longitudinally-discharged gas and metal vapor systems; i.e., atomic line filters and lasers. The electrode assembly 10 provides a chemically-inert, non-sputtering electrode with a clear optical aperture, which does not crack a partially-evacuated containment cell or damage delicate vacuum seals of the gas and metal vapor systems. The electrode assembly 10 comprises a plurality of elements given in table 1 along with their reference numbers.

TABLE 1

| Reference Number | Element |
| --- | --- |
| 12 | Split-Ring, Hollow-Cathode Electrode |
| 14 | Metallic Spacer |
| 16 | Vacuum-Enclosing Flange |

The split-ring, hollow-cathode electrode 12 preferably has a cylindrical shape and comprises a material of thoriated tungsten with an alloy composition of tungsten (W) and from about 2% to about 3% of thorium dioxide ThO2. Although it is extremely brittle, the 2% thoriated tungsten is preferred because it has more conduction electrons available in creating and maintaining the discharge condition of the systems. The cylindrical electrode 12 essentially, in and of itself, performs the operational functions for a cathode electrode of discharge gas and metal vapor systems.

The electrode 12 has a tip 12A and a base 12B, whereas the vacuum enclosing flange 16 has an outer sealing face 18 and an inner sealing face 20. The tip 12A further includes at least one slot 12C and at least one annular groove 12D. The slots 12C and the groove 12D provide the electrode 12 with a split-ring tip 12A. The split-ring tip 12A in turn provides the electrode 12 with enough mechanical flexibility to prevent the thermal expansion of the electrode from otherwise cracking the containment cell (to be described with reference to FIG. 3). The annular groove 12D and the slots 12C at the tip 12A of the electrode are preferably formed by a chemical etching process.

The base 12B of the electrode 12 is brazed onto the copper spacer 14, shown by brazes 22 having a dot-like shape. It is preferred that a nickel braze be used for such brazing. The assembled base 12B and spacer 14 is brazed onto a vacuum flange 16 preferably by nickel brazes 24 also having a dot-like shape.

The flange 16 and the spacer 14 along with copper sealing gaskets 26 (see FIG. 3) serve as the electrically conductive members to which is connected one end of conductive member 28 (see FIG. 3) having its other end connected to a source of excitation for exciting the electrode 12 when it is used in a gas or metal vapor discharge system. More particularly, as seen in FIG. 3, one end of the conductive member 28 is connected to flange 16 by appropriate means 30, such as soldering or brazing. As is known in the art, a source of excitation that is applied to the cylindrical electrode 12 may be pulsed excitation of several kilovolts at several hundred amperes peak current.

The spacer 14, shown in FIG. 1, and the vacuum flange 16, with sealing surfaces 18 and 20, are formed of metal and metal alloys that conduct electricity. For example, the electrically conductive materials may be selected from the group consisting of copper, stainless steel, titanium (for devices having relatively low operating temperatures), tantalum, tungsten, iron, nickel, gold, platinum, rhodium, molybdenum, iridium, thulium and alloys composed of combinations thereof.

Figure 2:
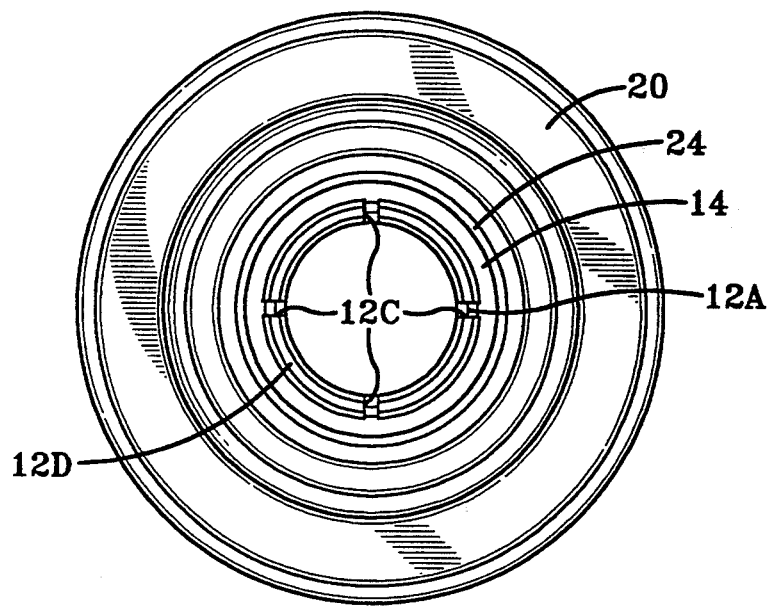
FIG. 2 is a top view of the split-ring, hollow-cathode electrode of the present invention.

FIG. 2 is a top view of the electrode assembly 10 illustrating the tip 12A of the electrode 12 as having the four slots 12C preferably spaced apart from each other by 90°. Further, FIG. 2 illustrates the groove 12D as encircling the complete circumference of the tip 12A. The spacer 14 is also of a continuous type, preferably I-shaped in cross-section. Although FIG. 2 shows the electrode assembly 10 as preferably having a cylindrical shape, it should be realized that other shapes may be used so long as the selected shape conforms to the containment cell in which it is housed. The containment cell in which the electrode assembly may be mounted may be further described with reference to FIG. 3 showing a discharge device 32.

The discharge device 32 comprises a hollow, electrically-insulating, elongated element 34 preferably formed of a ceramic material and whose interior serves as a discharge chamber and which acts as a containment cell for both of the electrode assemblies 10 shown in FIG. 3. The containment cell 34 has opposite end regions 36 and 38, in which respective electrode assemblies 10 are mounted. As seen in FIG. 3, the containment cell 34 has a first metal vacuum flange 40 at each of its opposite ends. Each metal vacuum flange 40 has an inner face 42 which is mated with face 20 by means of the annular copper seal member 26. Similarly, a second metal vacuum flange 44 has an inner face 46 which is mated with face 18 by means of another annular copper seal gasket member 26. All of elements 16, 26, 40 and 44 for enclosing a vacuum contribute to the proper operation of the discharge device 32. As further seen in FIG. 3, all of the elements 16, 34, 40 and 44 have hollows that provide for a clear optical aperture 48 defined by dimensional lines 50 and 52. As still further seen in FIG. 3, the oppositely positioned electrode assemblies 10 are spaced apart from each other so as to define a central region 54 of the containment cell 34. The electrode assemblies 10 of the present invention confine the discharge condition, commonly manifested as a glow discharge, between their tips and such a containment is shown to occur within the central region 54 of the containment cell 34.

The discharge device 32 further comprises optical windows 56 each located at opposite ends thereof. Each of the windows 56 is in alignment with the clear optical aperture 48. The optical window 56 may be selected to be any optically-related type so as to allow the light from the glow discharge condition to exit either of the windows, or, alternatively, one of the optical windows may be of a reflective type and the other may be of a light-transmissive type so that the light of the glow discharge only exits from the light-transmissive optical window. The reflective window may be mounted with its "surface normal" parallel to the longitudinal axis of the containment cell 34. In those cases where the light or optical laser radiation is to pass out of the transmissive window, the transmissive optical window 56 should be selected to be of a light-transmissive material.

As is known in the art, different variations of these optical windows may be accomplished.

The split-ring, hollow-cathode, thoriated-tungsten electrode 10 of the present invention has at least several advantages over prior art electrodes. For example, discharge tests were performed on the thoriated-tungsten electrode assembly 10 of the present invention and it was found not to sputter at operating temperatures in excess of 1500° C. Further, the hollow-cathode aspects of the electrode assemblies 10 confined the discharge between the tips 12A of the electrode assemblies 10. The hollow electrode assembly 10 provides a clear optical aperture to transmit light generated within the containment region 54 of the containment cell 34. Still further, the split-ring tip 12A provided the mechanical flexibility necessary to prevent thermal expansion from causing cracking of the containment cell 34 or of the outer edge of the electrode tip 12A itself. The I-shaped copper spacer 14 prevented thermal stress from cracking the base 12B of the electrode assembly 10 which would otherwise occur during the brazing process described in the "Background" section. Further, the brazing of the cylindrical electrode 12 directly onto the vacuum flange 16 allowed for many usages of the electrode 12 without the need of refurbishing the vacuum seal, as also discussed in the "Background" section.

It should now be appreciated that the practice of the present invention provides for a thoriated-tungsten cathode electrode assembly that is non-sputtering and which increases the operational lifetime of the gas or metal vapor discharge system in which it is used because this electrode assembly does not crack the containment cell in which it is housed nor does it allow the arc condition to find its way to the delicate vacuum seals used in gas and metal vapor discharge systems.

Many modifications and variations of the present invention are possible in view of the above disclosure. It is therefore to be understood that within the scope of the appended claims the invention may be practiced otherwise than as specifically described.

What we claim is:

1. An electrode assembly for use in a discharge device comprising:
    a) a hollow cylindrical member comprising thoriated tungsten with an alloy composition of tungsten (W) and from about 2% to about 3% of thorium dioxide ThO2 and having a tip and a base, said tip comprising at least one groove and at least one slot therein;
    b) a metallic spacer that is I-shaped in cross-section and that is connected to the base of said cylindrical member;
    c) sealing means for enclosing a vacuum and having at least one flange which is attached to said I-shaped spacer.

2. An electrode assembly according to claim 1, wherein said I-shaped spacer and said vacuum flange is selected of a metal that is electrically conductive.

3. An electrode assembly according to claim 2, wherein said electrically conductive metal is selected from the group consisting of copper, stainless steel, titanium, tantalum, tungsten, iron, nickel, gold, platinum, rhodium, molybdenum, iridium, thulium and alloys composed of combinations thereof.

4. An electrode assembly according to claim 2, wherein said spacer and said flange comprise the electrically conductive means for connecting said cylindrical member to a source of excitation.

5. An electrode assembly according to claim 1, wherein said at least one slot comprises four such slots which are circumferentially spaced apart from each other by about 90°.

6. An electrode assembly according to claim 1, wherein said I-shaped spacer and said base of said cylindrical member are connected to each other by a nickel braze.

7. An electrode assembly according to claim 1, wherein said I-shaped spacer is connected to said flange by a nickel braze.

8. A discharge device having opposite ends and comprising:
   a) a hollow, electrically-insulated elongated element whose interior serves as a discharge chamber and confines a discharge plasma;
   b) a pair of cylindrical electrodes, each electrode located at a different end of said discharge chamber and comprising thoriated tungsten with an alloy composition of tungsten (W) and from about 2% to about 3% of thorium dioxide $ThO_2$, each of said electrodes having a tip and a base, said tip comprising a groove in its outermost edge and having at least one slot also in the outer portion;
   c) a pair of metallic spacers, each spacer being I-shaped in cross-section and being attached to the base of a respective one of said cylindrical electrodes;
   d) a plurality of members each having the means for enclosing a vacuum and each having first and second flange surfaces, at least one of said members having its interior surface respectively attached to a respective one of said I-shaped spacers; and
   e) a pair of optical windows, each window being attached to an opposite end of said discharge device.

9. An electrode assembly for use in a discharge device comprising:
   a) an electrode member comprising thoriated tungsten with an alloy composition of tungsten (W) and from about 2% to about 3% of thorium dioxide $ThO_2$, said electrode having a tip and a base, said tip having a groove in its outermost edge and also at least one slot in its outermost edge;
   b) a copper spacer that is I-shaped in cross-section attached to said base of said electrode member; and
   c) a sealing member having means for enclosing a vacuum attached to said I-shaped spacer.

10. An electrode assembly according to claim 9, wherein said sealing member is metallic and is adapted to be connected to an electrical conductor.

* * * * *